(12) United States Patent
Puzan et al.

(10) Patent No.: US 7,590,322 B2
(45) Date of Patent: Sep. 15, 2009

(54) FIBER OPTIC CABLE WITH ENHANCED SALTWATER PERFORMANCE

(75) Inventors: James J. Puzan, Canton, GA (US); Christopher W. McNutt, Woodstock, GA (US); Jeffrey S. Laws, Brownwood, TX (US)

(73) Assignee: Superior Essex Communications LP, Atlanta, GA (US)

( * ) Notice: Subject to any disclaimer, the term of this patent is extended or adjusted under 35 U.S.C. 154(b) by 0 days.

(21) Appl. No.: 12/075,014

(22) Filed: Mar. 7, 2008

(65) Prior Publication Data
US 2008/0219627 A1    Sep. 11, 2008

Related U.S. Application Data

(60) Provisional application No. 60/906,113, filed on Mar. 9, 2007.

(51) Int. Cl.
*G02B 6/44* (2006.01)
(52) U.S. Cl. ............................................. 385/109
(58) Field of Classification Search ............ 385/109
See application file for complete search history.

(56) References Cited

U.S. PATENT DOCUMENTS

| | | | | |
|---|---|---|---|---|
| 5,039,197 A | * | 8/1991 | Rawlyk | 385/102 |
| 2003/0118295 A1 | * | 6/2003 | Lail et al. | 385/101 |

* cited by examiner

*Primary Examiner*—Jerry T Rahll
*(74) Attorney, Agent, or Firm*—King & Spalding

(57) ABSTRACT

A fiber optic cable can inhibit water, that may inadvertently enter the cable, from damaging the cable's optical fibers. The fiber optic cable can comprise a buffer tube defining an interior volume extending along the fiber optic cable. Optical fibers can be disposed in the interior volume of the buffer tube, along with water-swellable materials, such as tapes and yarns. The interior volume can be dry or free from water-blocking gels or fluids. The water-swellable materials can provide the fiber optic cable with an unexpected level of protection from seawater. The water-swellable materials can, for example, limit flow of seawater along the interior volume. In an exemplary embodiment, progression of seawater in the interior volume be limited to three meters or less for a twenty four hour test period during which the seawater is under about one meter of head pressure.

10 Claims, 4 Drawing Sheets

FIBER OPTIC CABLE WITH ENHANCED SALTWATER PERFORMANCE

CROSS REFERENCE TO RELATED APPLICATIONS

This patent application claims priority under 35 U.S.C. §119 to U.S. Provisional Patent Application No. 60/906,113, entitled "Water Blocking Fiber Optic Cable" and filed Mar. 9, 2007, the entire contents of which are hereby incorporated herein by reference.

FIELD OF THE TECHNOLOGY

The present invention relates to placing water-swellable material in a fiber optic cable to protect the cable's optical fibers, (such as loose fibers, fiber bundles, or ribbonized fiber) from moisture, and more specifically to providing an enhanced level of protection against seawater or water having a substantial concentration of salt, such as sodium chloride.

BACKGROUND

Fiber optic cables include one or more optical fibers or other optical waveguides that conduct optical signals, for example carrying voice, data, video, or other information. In a typical cable arrangement, optical fibers are placed in a tubular assembly. A tube may be disposed inside an outer jacket or may form the outer jacket. In either case, the tube typically provides at least some level of protection for the fibers contained therein.

Optical fibers are ordinarily susceptible to damage from water and physical stress. Without an adequate barrier, moisture may migrate into a fiber optic cable and weaken or destroy the cable's optical fibers. Without sufficient physical protection, stress or shock associated with handling the fiber optic cable may transfer to the optical fibers, causing breakage or stress-induced signal attenuation.

One conventional technique for protecting the optical fibers from damage is to fill the cable with a fluid, a gel, a grease, or a thixotropic material that strives to block moisture incursion and to absorb mechanical shock. Such fluids and gels are typically messy and difficult to process, not only in a manufacturing environment but also during field service operations. Field personnel often perform intricate and expensive procedures to clean such conventional materials from optical fibers in preparation for splicing, termination, or some other procedure. Any residual gel or fluid can render a splice or termination inoperably defective, for example compromising physical or optical performance.

Another conventional technology for protecting optical fibers entails placing a water absorbent chemical, such as water-swellable material, within the cable. The chemical absorbs water that may inadvertently enter the cable, and swells to prevent the water from traveling down long lengths of cable and degrading the delicate optical fibers. In one conventional approach, particles of the water absorbent chemical are mixed with the gel discussed above, and the mixture is inserted into the cable. This approach typically suffers from the same drawbacks as using a pure form of a gel; gels and related materials are messy and difficult to process.

In another conventional approach, a water-swellable chemical is applied to the surface of a tape or a yarn that is inserted in the cable lengthwise. If water enters the cable, the water-swellable chemical interacts with the water and swells to impede and stop water flow lengthwise along the cable. However, conventional tape and yarn technologies typically offer limited protection against incursions of seawater. The salt content of seawater typically reduces the effectiveness of water-swellable chemicals via interfering with the interaction between the seawater and the chemicals.

In many instances, a manufacturer will label a fiber optic cable seawater resistant if the cable can pass a test involving subjecting the cable to a three percent seawater mixture. In such tests, typically three percent of the solution is seawater and the remaining ninety-seven percent is distilled water. Since natural seawater has a salinity of between about three percent and about five percent, such tests provide a salinity of only about 0.09 percent (3% seawater multiplied by 3% salinity equals 0.09% net salinity) and a corresponding specific gravity of only about 1.004.

Withstanding seawater having a three percent salinity is significantly more challenging than withstanding a three percent seawater solution. In an actual field deployment, a fiber optic cable may need to withstand the full, three-to-five percent salinity of seawater. Otherwise, the fiber optic cable may have an increased risk of failure.

Accordingly, to address these representative deficiencies in the art, an improved capability is needed for protecting optical fibers from water damage. Further need exists for a fiber optic cable that can protect optical fibers of a fiber optic cable from seawater or saltwater. A need further exists for a fiber optic cable that can restrict the flow of any saltwater or seawater that might inadvertently enter the cable, to avoid lengthwise progression of unwanted saltwater or seawater. A capability addressing one or more of the aforementioned needs, or some related need in the art, would provide robust fiber optic installments and would promote optical fibers for communications and other applications.

SUMMARY

The present invention can support protecting an optical fiber from attack by water, seawater, saltwater, or aqueous fluid containing salt, sodium chloride, or other ionic material.

In one aspect of the present invention, a fiber optic cable can comprise an internal space running along the fiber optic cable, for example within a buffer tube of the cable. One or more optical fibers and one or more water-blocking materials can be disposed in the space. Such water-blocking materials can comprise yarns, tapes, powders, particles, or other dry materials that swell upon contact with any water inadvertently entering the fiber optic cable, for example. The fiber optic cable can provide marked resistance to seawater incursions, for example providing unexpected performance under controlled testing. In an exemplary test, when an open end of the fiber optic cable is subjected to seawater having one meter of head pressure, the fiber optic cable can limit the flow or progress of the seawater along the internal space to less than three meters over a twenty-four hour test period.

The discussion of protecting optical fibers presented in this summary is for illustrative purposes only. Various aspects of the present invention may be more clearly understood and appreciated from a review of the following detailed description of the disclosed embodiments and by reference to the drawings and the claims that follow. Moreover, other aspects, systems, methods, features, advantages, and objects of the present invention will become apparent to one with ordinary skill in the art upon examination of the following drawings and detailed description. It is intended that all such aspects, systems, methods, features, advantages, and objects are to be included within this description, are to be within the scope of the present invention, and are to be protected by the accompanying claims.

Figure 1:
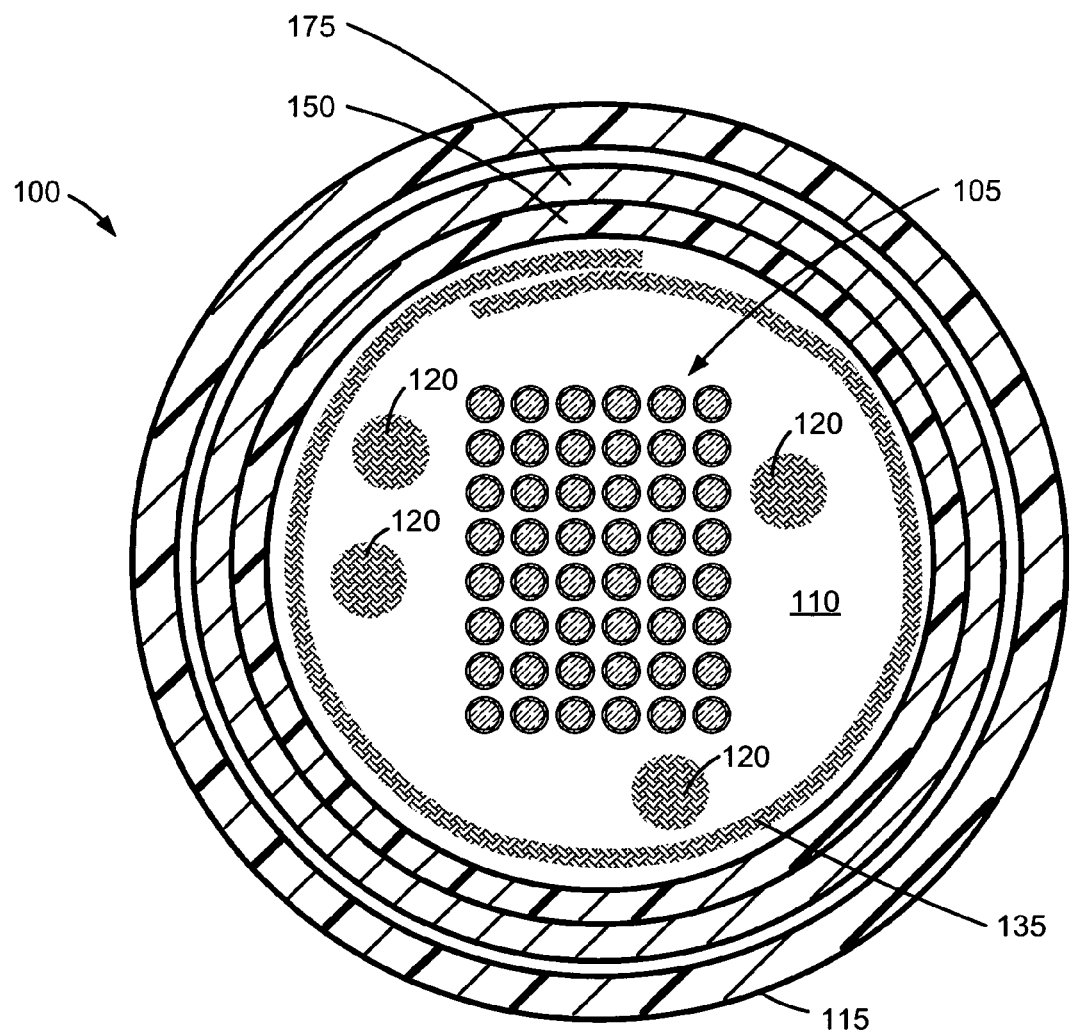
FIG. 1 is a cross sectional illustration of an exemplary fiber optic cable that provides a high level of protection against seawater incursion in accordance with certain embodiments of the present invention.

Many aspects of the invention can be better understood with reference to the above drawings. The elements and features shown in the drawings are not to scale, emphasis instead being placed upon clearly illustrating the principles of exemplary embodiments of the present invention. Moreover, certain dimensions may be exaggerated to help visually convey such principles. In the drawings, reference numerals designate like or corresponding, but not necessarily identical, elements throughout the several views.

DETAILED DESCRIPTION OF EXEMPLARY EMBODIMENTS

The present invention can support protecting an optical fiber from damage due to moisture incursion. As will be discussed in further detail below, such protection can include an unexpectedly high level of protection against salty water, such as seawater.

An exemplary embodiment of the present invention supports protecting an optical fiber within a fiber optic cable from water attack. The protection can also include stabilizing the optical fiber and/or cushioning the optical fiber from mechanical impact, shock, physical stress, jarring, unwanted motion, damaging acceleration or deceleration, force, or other detrimental effect.

The fiber optic cable can comprise a jacket that extends along the fiber optic cable. The jacket can comprise a sheath, a sheathing, a casing, a shell, a skin, or a tube spanning the fiber optic cable, typically comprising pliable or flexible material such as plastic or polymer. Thus, the jacket can run lengthwise along the fiber optic cable. The jacket can form or define a core within the cable that can comprise a longitudinal cavity, a hollow space, or a cylindrical volume. In other words, the jacket can enclose a volume that contains various other elements, features, structures or components of the fiber optic cable, with the jacket typically being open at the cable ends (prior to termination), and therefore exposing the core, at each end of the fiber optic cable.

One or more optical fibers can be situated in the core, running or extending lengthwise along the fiber optic cable. In certain exemplary embodiments, the core may also contain various other linear cabling components, such as strength members, tapes, rip cords, buffer tubes, etc.

A gas, for example air, can be disposed in the core volume along with the optical fibers, with the gas contacting the optical fibers along the length of the fiber optic cable. In other words, the core of the fiber optic cable can include a hollow region (or free volume) that extends lengthwise, with the optical fibers disposed in the hollow region. In certain exemplary embodiments, a buffer tube defines hollow region. That is, the optical fibers may be located in a buffer tube. Rather than being filled with a fluid or gel for protecting the optical fibers, the inside of the buffer tube is typically dry (absent any unwanted water that might enter the buffer tube).

The term "dry," as used herein in the context of characterizing a fiber optic cable or a buffer tube, generally indicates that the fiber optic cable or buffer tube does not contain any fluids, greases, or gels for blocking water incursion.

As will be discussed in further detail below, a system of one or more water-swellable yarns and one or more water-swellable tapes is disposed in buffer tube to provide water protection. That system can be optimized to provide a marked level of protection against seawater or saltwater incursion.

Certain exemplary embodiments of the present invention can support protecting an optical fiber from attack by water having a high salt content, for example seawater or brackish water. For example, a fiber optic cable can comprise a tube extending along the fiber optic cable and circumferentially surrounding a bundle, group, ribbon, or array of optical fibers. The tube can comprise a sheath, sheathing material, a casing, a shell, a jacket that extends along the cable, a buffer tube, or a structure that is internal to the cable. The tube can comprise an inner wall, such as a surface that faces the optical fibers. That is, the optical fibers can be disposed in the tube, with an inner surface of the tube facing towards the optical fibers and another, outer surface facing away from the optical fibers.

Water-swellable material can be disposed in the tube along with the optical fibers. The water-swellable material can comprise a material, an agent, a chemical, or a substance that captures, takes up, collects, or absorbs water that may enter the tube. That is the water-swellable material can interact with water (or some other foreign chemical or substance with a capability to harm the fiber) to inhibit the water from damaging the optical fiber. The interaction can comprise, without limitation, physical absorption, chemical absorption, binding, one or more chemical reactions, adsorption, a material expansion of the material, soaking up (like an open cell sponge), etc.

The water-swellable material can be adhered to a substrate, such as a tape, a flat piece of material, a ribbon, a thread, a yarn, a twine, etc. In certain exemplary embodiments, the water-swellable material can be embedded in another material, for example a foamed polymer. Further, the water-swellable material can comprise particles, powders, or other forms of materials that may be loose, attached to a substrate, or embedded in a larger body of material. Such a water-swellable material can comprise a super absorbent polymer ("SAP") such as sodium polyacrylate or polyacrylamide, for example.

A fiber optic cable in accordance with certain exemplary embodiments of the present invention incorporates water-swellable tapes and water-swellable yarns for capturing or absorbing moisture that may inadvertently enter the cable following field deployment. A system that includes one concentric water-swellable tape and multiple water-swellable yarns protects the cable's optical fibers from excessive longitudinal contact with water that can otherwise attack the fibers and physically and optically degrade the fiber's glassy materials and the cable's overall performance. Longitudinally confining any water that may enter the fiber optic cable effectively confines the water damage. Accordingly, the damaged area can be severed and removed, without sacrificing the entire cable.

A loose tube fiber optic cable in accordance with an exemplary embodiment of the present invention provides a configuration of yarns and tapes that overcomes the limitations of conventional water-blocking technology and that does not necessarily comprise any gels, fluids, or similar water-blocking materials. While typically applied to loose tube fiber optic cables, similar cables that comprise metallic conductors may also benefit from the configuration.

Figure 2:
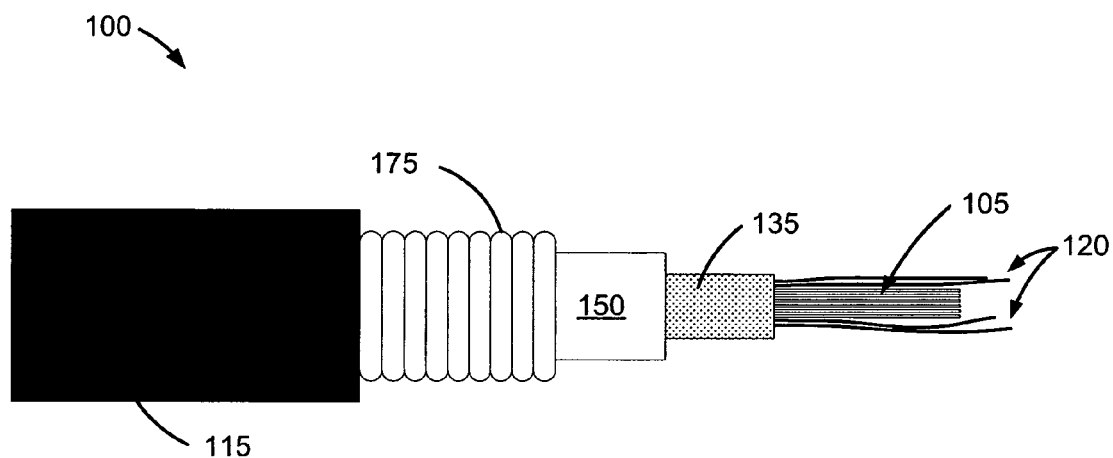
FIG. 2 is a side illustration of an exemplary fiber optic cable that provides a high level of protection against seawater incursion in accordance with certain embodiments of the present invention.
Figure 3:
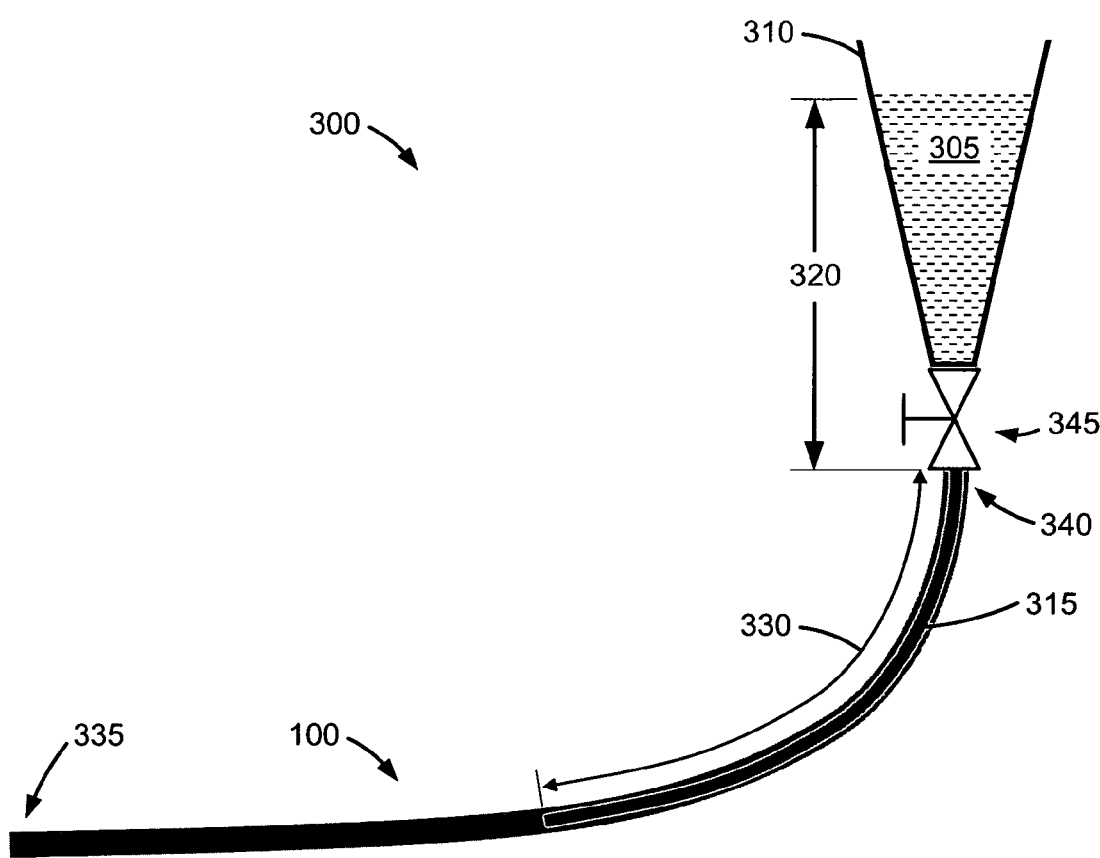
FIG. 3 is an illustration that depicts testing water blockage performance of an exemplary fiber optic cable offering a high level of protection against seawater incursion in accordance with certain embodiments of the present invention.
Figure 4:
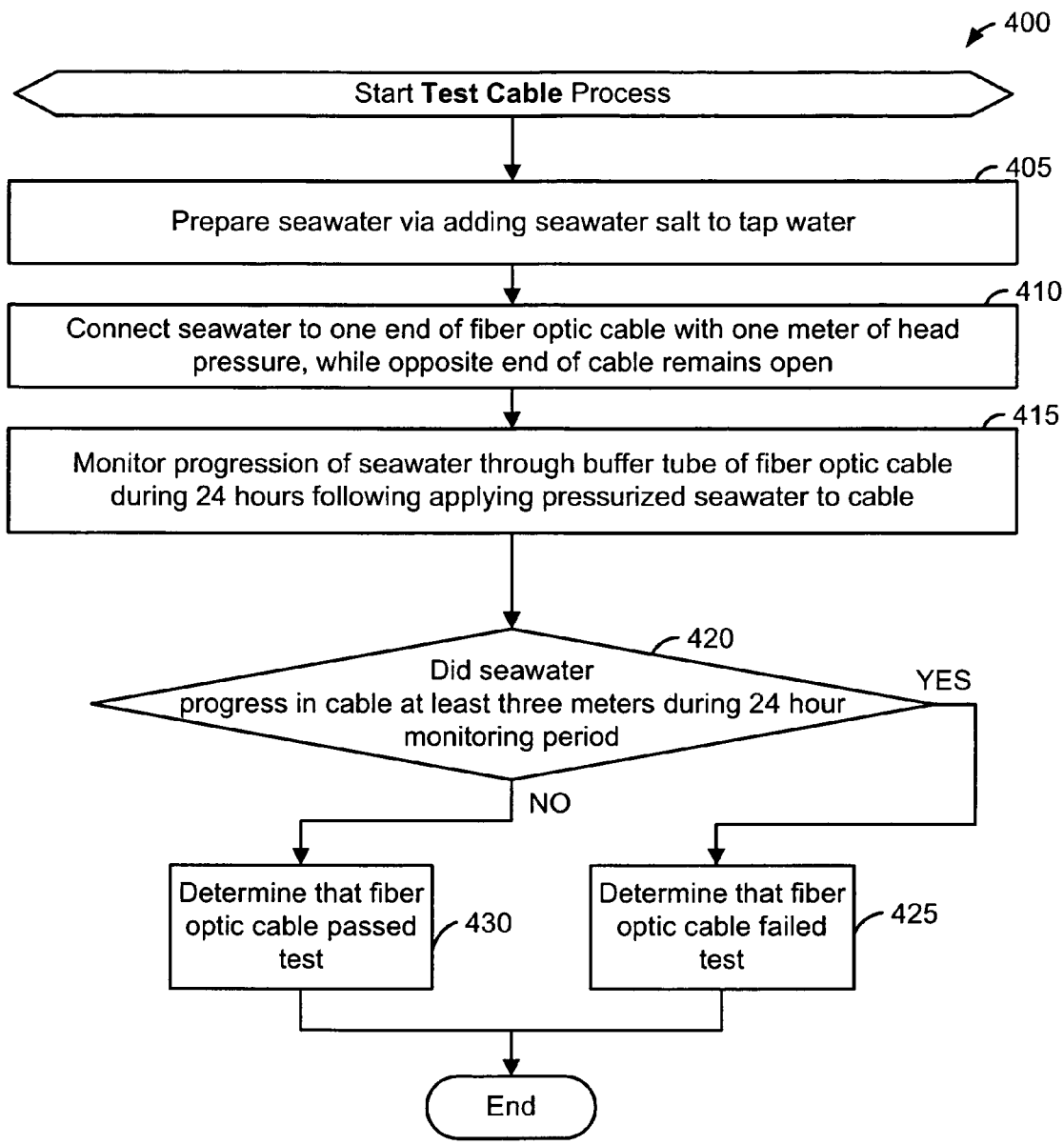
FIG. 4 is a flowchart of an exemplary process for testing seawater blockage performance of fiber optic cables in accordance with certain embodiments of the present invention.

A method and apparatus for protecting an optical fiber will now be discussed more fully hereinafter with reference to FIGS. 1-4, which describe representative embodiments of the present invention. FIGS. 1 and 2 respectively provide end-on and lengthwise views of a fiber optic cable providing enhanced protection against seawater. FIGS. 3 and 4 describe testing seawater performance of fiber optic cables. Tables 1 and 2 present unexpected test results demonstrating a marked level of seawater performance for exemplary embodiments of the present invention.

The invention can be embodied in many different forms and should not be construed as limited to the embodiments set forth herein; rather, these embodiments are provided so that this disclosure will be thorough and complete, and will fully convey the scope of the invention to those having ordinary skill in the art. Furthermore, all "examples" or "exemplary embodiments" given herein are intended to be non-limiting, and among others supported by representations of the present invention.

Turning now to FIGS. 1 and 2, these figures illustrate a fiber optic cable 100 providing a high level of protection against seawater incursion in accordance with certain exemplary embodiments of the present invention. FIG. 1 provides an end-on view, while FIG. 2 presents a side view.

As discussed below, the fiber optic cable 100 has a configuration tailored or optimized to inhibit water penetration and water migration down the cable 100. Thus, the fiber optic cable 100 can block distilled water, freshwater, condensed water, tap water, rain, ionic waters, salt water, run-off, urban run-off, seawater, brackish water, sewage, water with dissolved sodium chloride, etc.

The fiber optic cable 100 comprises water-swellable tape 135 and water-swellable yarn 120 functioning in a collaborative or synergistic manner. The illustrated configuration can not only block freshwater but also blocks seawater and other water that may contain salt, salt and dissolved minerals, or substantial levels of ionic material. Accordingly, the fiber optic cable 100 can be deployed in a marine environment without necessarily incorporating superabsorbent materials that are rated for marine applications. Thus, a marine-rated cable can be manufactured with economical water-blocking compounds such as sodium polyacrylate conventionally limited to deployment in freshwater environments. In certain exemplary embodiments, sodium polyacrylate is the exclusive water-swellable chemical agent included in the fiber optic cable 100, wherein that agent may be attached to a substrate such as a yarn or a tape.

The exemplary fiber optic cable 100 of FIG. 1 comprises a jacket 115 providing the cable's outer, cylindrical surface. The jacket 115 can have a polymer composition, for example a fluoropolymer such as FEP, TFE, PTFE, PFA, etc. Alternatively, the jacket 115 can comprise olefin, polyester, silicone, polypropylene, polyethylene, medium density polyethylene, polyimide, or some other polymer or other material that provides acceptable strength, fire resistance, or abrasion and chemical properties as may be useful for various applications. Generally, the jacket 115 provides environmental protection as well as strength. The jacket 115 can be characterized as a sheath or a casing.

In the illustrated embodiment, the jacket 115 circumferentially covers a corrugated metal armor 175 that offers mechanical protection, including crush resistance. In many situations the corrugated metal armor 175 is optional and may or may not extend along the length of the fiber optic cable 100. In certain exemplary embodiments, the corrugated metal armor 175 comprises a shield, and the fiber optic cable 100 can be viewed as a shielded cable, for example.

In certain exemplary embodiments, the cable 100 might comprise a small annular space between the jacket 115 and the corrugated metal armor 175. However, the jacket 115 usually adheres to the corrugated metal armor 175, for example as a result of a fabrication process that extrudes the jacket 115 over the corrugated metal armor 175. In certain exemplary embodiments, the corrugated metal armor 175 includes an outer coating of polymer that adheres to the jacket 115 when the jacket 115 is applied to the fiber optic cable 100. In this situation, the coating of polymer bonds the jacket 115 and the corrugated metal armor 175 to one another.

In certain exemplary embodiments, the fiber optic cable 100 comprises strength members (not illustrated in FIGS. 1 and 2), such as slender steel or fiberglass rods or aramid cords, disposed between the corrugated metal armor 175 and the jacket 115. For example, two radial strength members can be located under the jacket 115 to enhance structural support.

One or more "rip cords" may also be disposed between the jacket 115 and the corrugated metal armor 175 to facilitate separating the jacket 115 from the corrugated metal armor 175 via pulling the rip cords. In other words, the rip cords help open the fiber optic cable 100 for installation or field service.

The fiber optic cable 100 also comprises a buffer tube 150 disposed beneath the corrugated metal 175. In certain exemplary embodiments, some annular gap might be present between the buffer tube 150 and the corrugated metal armor 175. Usually, any such gap can also be filled, for example with water-swellable material. Ordinarily, the buffer tube 150 and the corrugated metal armor 175 can be essentially flush with one another.

The term "buffer tube," as used herein, generally refers to a tube for containing one or more optical fibers and for providing such optical fibers annular space for lateral movement. When a fiber optic cable is bent, optical fibers in a buffer tube of the cable may move towards one side of the buffer tube, for example.

In certain exemplary embodiments, the fiber optic cable 100 comprises an aramid material or some other form of strength member disposed between the buffer tube 150 and the corrugated metal armor 175. One or more rip cords may also be disposed between the buffer tube 150 and the corrugated metal armor 175 to facilitate opening the corrugated metal armor 175 in connection with terminating the fiber optic cable 100, or performing some related service.

In an exemplary embodiment, the buffer tube 150 extends along the cable's longitudinal axis and is formed from high density polyethylene. The buffer tube 150 provides a space 110 for optical fibers 105 and protective materials. The space 110 is a three-dimensional or cylindrical volume extending along the fiber optic cable 100. In the illustrated exemplary embodiment, the protective materials comprise water-swellable yarns 120 and a water-swellable tape 135 disposed in the space 110 along with the optical fibers 105. Accordingly, the buffer tube 150 contains a bundle of optical fibers 105 disposed "loose" in the tube's hollow interior.

In certain exemplary embodiments, the fiber optic cable 100 comprises a gas such as air or nitrogen in the space 110, with such gas contacting the optical fibers, the water-swellable yarns 120, and the water-swellable tape 135, for example. In certain exemplary embodiments, the space 110 is essentially filled with solid and gaseous materials, wherein the water-swellable yarns 120, the water-swellable tape 135, and the optical fibers 105 (which may comprise glass) are solid materials. Accordingly, the fiber optic cable 100 can comprise a "dry cable" that is free from substantial amounts of gels, greases, or fluids for protecting the optical fibers 105 from unwanted water or moisture incursions or for helping maintain the buffer tube's shape.

Moreover, the fiber optic cable 100 can comprise voids within the buffer tube 150 that are filled with gaseous matter or that are otherwise free from water-blocking gels, greases, or fluids. In one exemplary embodiment, the space 110 is filled by, consists of, or essentially consists of: (a) dry water-blocking materials (such as the water-swellable yarns 120 and the water-swellable tape 135); (b) air; and (c) the optical fibers 125. In this situation; contaminates, moisture, debris, water that the water-blocking materials are addressing, secondary materials present from manufacturing, and related matter may nevertheless be present in the space 110.

In the illustrated exemplary embodiment, the fiber optic cable 100 contains 48 optical fibers 105 in the buffer tube 150. The optical fibers 105 can form a bundle with ribbons of the optical fibers 105 adhering to one another to form a single unit. A twist in the bundle of optical fibers 105 along the length of the fiber optic cable 100 captures the ribbon stack into a single unit and helps distribute bending stresses among individual optical fibers 105. That is, a stack of ribbons of optical fibers 105 exhibits a lay or a periodic rotation about its central axis. The bundle of optical fibers 105 has freedom of motion within the buffer tube 150, as the inner diameter of the buffer tube 150 is somewhat larger than the diagonal of the bundle's cross section. In one exemplary embodiment, the ratio of the bundle's diagonal to the inner diameter of the buffer tube 150 is between about 0.62 and about 0.85.

In other words, in certain exemplary embodiments, the optical fibers 105 are organized in linear arrays or "ribbons" of optical fibers 105, with the arrays stacked on top of one another. For example, each ribbon may include twelve optical fibers 105, with the ribbons stacked to achieve the desired fiber capacity (typically up to 18 ribbons).

The illustrated number of optical fibers 105 and the illustrated configuration are intended to be exemplary rather than limiting. Each optical fiber 105 could be a single mode fiber or some other optical waveguide that carries communications data. In various exemplary embodiments, the optical fibers 105 can be single mode, or multimode and can have a composition based on glass, glassy, or silica material. Alternatively, the optical fibers 105 can incorporate plastic material as an optical transmission medium.

In certain exemplary embodiments, the electrically conductive wires, such as pairs of insulated conductors, are substituted for the optical fibers 105. Thus, the water-protective technology can be applied to communications cables that incorporate electrically conductive media rather than optical fibers (or in addition to optical fibers), coax cables, twisted pair cables, and hybrid fiber-copper cables, for example.

In the illustrated exemplary embodiment, the buffer tube 150 contains four water-swellable yarns 120 and one water-swellable tape 135 for protecting the optical fibers 105. The number of water-swellable yarns 120 and the number of water-swellable tapes 135 are exemplary rather than limiting. Strands of water-swellable yarn 120 lie alongside the optical fibers 105, typically in random locations and orientations. In an exemplary embodiment, the four illustrated strands of water-swellable yarns 120 are 1800 denier water-swellable yarn, such as those Geca Tapes BV of Bailleul, France sells under the product designator "Geca GTB-50."

The water-swellable yarns 120 can be slightly expanded in cross section when introduced into the buffer tube 150 during cable fabrication.

With the fiber optic cable 100 comprising water-swellable tape 135 and water-swellable yarns 120, the water absorption capacity of the water-swellable yarns 120 can be reduced relative to using water-swellable yarns as the exclusive water blocking material. That is, the water-swellable tape 135 and the water-swellable yarn 120 share the water absorption load, and the amount of water-swellable yarn 120 in the fiber optic cable 100 is typically lower than would be required for sufficient water protection if the water-swellable tape 135 was not also present. As discussed above, a synergism between the water-swellable tape 135 and the water-swellable yarn 120 supports using economical water-swellable chemicals, ordinarily limited to freshwater applications, in saltwater environments. Further, as discussed below, the fiber optic cable 100 can provide unexpected performance in terms of blocking saltwater and seawater.

In an exemplary embodiment, the water-swellable yarn 120 comprises particles of superabsorbent polymer ("SAP") that cling to yarn filaments. In certain exemplary embodiments, the particles cling without any adhesives, binders, cured materials, or wetted surfaces. The superabsorbent material chemically reacts with water, when present. However, in certain exemplary embodiments, the superabsorbent material is insoluble (or essentially insoluble) in water.

In one exemplary embodiment, the superabsorbent material comprises sodium polyacrylate powder. Although sodium polyacrylate is ordinarily limited to freshwater application, the architecture of the exemplary embodiment illustrated in FIGS. 1 and 2 provides an unexpectedly high performance with sodium polyacrylate powder as the water-swellable material of the water-swellable yarn 120 and the water-swellable tape 135.

The term "super absorbent polymer" or "SAP," as used herein, generally refers to a material that can absorb or otherwise capture at least 50 times its weight in water (including without limitation liquid and vapor forms of water) or a liquid. Polyacrylonitrile starch graft polymer, saponified polyacrylonitrile starch graft polymer, polyacrylamide, and sodium polyacrylate are examples of SAP; however, this is not an exhaustive list. Typically, SAP swells or may assume a gelatinous state in the presence of water, thereby absorbing the water. SAP materials may have a granular or powder form, may be beads, or may have in a variety of shapes. Many SAP materials can absorb 100 times their weight in water.

The term "water-swellable yarn," as used herein, generally refers to a yarn that comprises a super absorbent polymer, with the term encompassing yarn in which super absorbent polymer clings to a yarn surface. Yarn may comprise one or more threads, filaments, cords, ropes, fibrous materials, fibers, strands, or similar structures that may include man-made or natural materials.

The water-swellable yarns 120 typically have mechanical functionality in addition to absorbing water. The water-swellable yarns 120 provide a "cushioning" effect to reduce contact between the optical fibers 105 and the buffer tube 150, thereby improving signal quality. Orienting the water-swellable yarns 120 along the fiber optic cable's longitudinal axis, rather than helically wound around the optical fibers 105, avoids the water-swellable yarns 120 constricting the optical fibers 105 when the fiber optic cable 100 is strained.

In addition to providing mechanical cushioning, in certain exemplary embodiments, the water-swellable yarns 120 control coupling force between the optical fibers 105 and the fiber optic cable 100. Increasing the amount of water-swellable yarns 120 present in the buffer tube 150 can increase friction between the optical fibers 105 and the inner wall of the buffer tube 150. Likewise, few water-swellable yarns 120 translates to more freedom of longitudinal motion for the optical fibers 105.

The water-swellable yarns 120 inhibit water flow into the fiber optic cable 100 and along the space 110 of the fiber optic cable 100. The water-swellable yarns 120 typically respond faster than the water-swellable tape 135 to initial water incursion, while the water-swellable tape 135 can absorb more water over an extended amount of time. Accordingly, the water-swellable yarns 120 offer the water-swellable tape 135 sufficient time to respond and swell to absorb the water. This synergistic response is particularly evident when seawater is introduced into the fiber optic cable 100 as will be discussed below with reference to FIGS. 3 and 4.

The water-swellable tape 135 within the buffer tube 150 extends lengthwise in the buffer tube 150 and is formed or wrapped around the bundle of optical fibers 105. More specifically, the water-swellable tape 135 runs generally parallel to the bundle of optical fibers 105 and is curled lengthwise over the bundle of optical fibers 105. As a result of curling, one surface of the water-swellable tape 135 is adjacent and essentially parallel to the interior surface of the buffer tube 150. One lengthwise edge of the water-swellable tape 135 is placed over the tape's other lengthwise edge so that the water-swellable tape 135 fully circumscribes the bundle of optical fibers 105. Geca Tapes BV is a suitable tape supplier, for example the product designated "Geca GFX-1135."

The term "water-swellable tape," as used herein, generally refers to a slender strip of material that comprises a super absorbent polymer, with the term encompassing tape in which super absorbent polymer clings to a tape surface. The slender strip of material can comprise a ribbon, a strip of cloth, a strip of film, etc. and may include one, two, or more different types of materials.

In an exemplary embodiment, the water-swellable tape 135 in the buffer tube 150 comprises a single layer of non-woven polyester with particles of superabsorbent polymer powder adhering loosely to one surface thereof. In one exemplary embodiment, the substrate material is not necessarily inherently flame retardant. The particles typically cling to the polyester substrate without any adhesives, curing, or intervening materials. Alternatively, one or more adhesive agents may adhere SAP to the tape substrate. The non-woven substrate can be porous, with SAP particles disposed in, but not necessarily filing the pores. The thickness and width of the substrate (and of the water-swellable tape 145 itself) can be been controlled to optimize water blocking.

The side of the water-swellable tape 135 to which the SAP particles adhere typically faces the optical fibers 105, while the opposite, bare side contacts the interior wall of the buffer tube 150 and thus faces outward. The water-swellable tape 135 and the water-swellable yarn 120 typically comprise similar chemicals for water absorption. In an exemplary embodiment, the water-swellable tape 135 can be non-compressible, without necessarily needing any foam material, foam layers, adhesives, binders, cured agents, or wetted material.

In certain exemplary embodiments, a second, outer water-swellable tape (not illustrated in FIGS. 1 and 2) is located outside the buffer tube 150 and is curled over the buffer tube 150 in essentially the same manner that the illustrated water-swellable tape 135 is curled over the bundle of optical fibers 105. The outer water-swellable tape typically has the same structure, composition and features as the illustrated water-swellable tape 135. However, one difference between the outer water-swellable tape and the illustrated water-swellable tape 135 is that the outer water-swellable tape is typically wider to accommodate the larger circumference needed to cover the outer surface of the buffer tube 150. Accordingly, the outer tape can comprise a single ply of polyester material coated with SAP particles on one side thereof, with the coated side facing inward.

Exemplary tests for evaluating seawater performance of fiber optic cables will now be described with reference to FIGS. 3 and 4. FIG. 3 illustrates a set up 300 for testing water blockage performance of a fiber optic cable 100 offering a high level of protection against seawater incursion in accordance with certain exemplary embodiments of the present invention. FIG. 4 illustrates a flowchart of a process 400 for testing seawater blockage performance of a fiber optic cable 100 in accordance with certain exemplary embodiments of the present invention.

In the set up 300 of FIG. 3, the fiber optic cable 100 is connected to a reservoir 310 that provides seawater 305 with one meter of head pressure. In other words, vertical distance 320 between the surface of the seawater 305 and the cable end 340 of the fiber optic cable 100 that is under test is one meter.

A valve 345 located between the fiber optic cable 100 holds back the seawater 305 until the test begins, at which point the valve 345 is opened. When the valve 345 is opened, the head pressure applies force to the seawater 305 at the cable end 340, encouraging the seawater 305 to flow and progress through the fiber optic cable 100.

In this test configuration, opening the valve 345 wets the fiber optic cable 100 for the first time. However, an alternative testing methodology (which was not used in any of the actual tests described below) involves pre-wetting the cable end 340 of the fiber optic cable 100 prior to applying head pressure, so as to provide additional reaction time for water-blocking materials. In another alternative testing methodology (which was not used in any of the actual tests described below), head pressure is gradually increased (rather than applied essentially instantaneously via opening the valve 345), again to provide more reaction time for water-blocking materials.

As illustrated in FIG. 4, the testing method 400, entitled "Test Cable," begins at step 405 with preparation of the seawater 305 via a recipe that provide a high ionic concentration. Since ionic water tends to breakdown and limit effectiveness of water-swellable powders and materials, seawater tests are generally more demanding than freshwater tests. Increasing the ionic concentration of water (or increasing the water's specific gravity via adding salt or sodium chloride) reduces the water-blocking performance of water-swellable materials and fiber optic cables incorporating water-swellable materials. Accordingly, blocking a seawater incursion is more challenging than blocking a freshwater incursion.

The seawater 305 is prepared by dissolving sea salt in tap water to achieve a salinity of approximately three percent. That is, the seawater 305 used in the test has a composition of approximately three percent sea salt by weight. This salinity can be achieved by dissolving approximately 114 grams of sea salt per gallon (3.7854 liters) of tap water. Suitable sea salt material is widely available at aquarium retailers under the trade identifier "Oceanic Natural Sea Salt." This recipe is believed to reasonably emulate natural seawater so that the result has a composition approximating natural seawater. After mixing, the measured specific gravity of the salt water solution should be at least 1.019 using a NIST traceable hydrometer.

The term "seawater," as used herein, refers to water having a salinity of at least three percent. The term "natural seawater," as used herein, refers to typical water of the Atlantic Ocean near the United States.

At step 410, one cable end 340 of a test sample of fiber optic cable 100 is coupled to the reservoir valve 345 with the valve 345 initially closed. The opposite cable end 335 remains open or unobstructed. Opening the valve 345 wets the cable end 340, which was dry prior to valve opening, and subjects the fiber optic cable 100 to one meter of water pressure or "head pressure."

At step 415, seawater 305 advances or flows through the space 110 of the fiber optic cable's buffer tube 150 as illustrated in FIG. 3 at reference number "315." The distance 330 of progression of the seawater 315 is monitored over a twenty-four hour test period, typically with human intervention.

At inquiry step 420, a determination is made regarding the distance 330 of seawater progression within the fiber optic cable 100. If the distance 330 is less than three meters after twenty-four hours has elapsed following subjecting the fiber optic cable 100 to seawater 305 under one meter of head pressure, then step 430 follows step 420. At step 430, the fiber optic cable 100 is determined to have passed the test. Following step 430, process 400 ends.

If, on the other hand, the seawater 315 has flowed three or more meters during the twenty-four hour test period, then at step 425, the fiber optic cable 100 is deemed to have failed the test. Following step 425, process 400 ends.

In summary, process 400 determines whether a fiber optic cable 100 fails or passes a seawater test according to whether seawater 305 pressurized to one meter of head pressure flows through the cable's buffer tube 150 a distance of three meters or more during the first twenty four hours following contact with the seawater 305.

Unexpected results of testing seawater performance of fiber optic cable samples will now be discussed with reference to Tables 1 and 2, shown below. These tests indicate that certain orientations of water-swellable tape 135 and water-swellable yarn 120 in a buffer tube 150, for example as illustrated in FIG. 1 and discussed above, provide unexpectedly high performance in blocking seawater penetration inside a fiber optic cable 100.

Table 1 shows the results of subjecting five fiber optic cables to the seawater testing method of the process 400, as described above with reference to FIGS. 3 and 4. These five cables were fabricated and tested with a goal of optimizing a configuration of water-swellable materials.

The fiber optic cable denoted "1)" in Table 1 included an eight-millimeter buffer tube containing 48 optical fibers and a water-swellable tape having a width of 26 millimeters. This fiber optic cable failed the seawater test as the seawater flowed more than three meters ("m") in two minutes.

The fiber optic cable denoted "2)" in Table 1 included an eight-millimeter buffer tube containing 48 optical fibers, two water-swellable yarns, and a water-swellable tape having a width of 26 millimeters. This fiber optic cable failed the seawater test as the seawater flowed more than three meters during the first hour of the test.

The fiber optic cable denoted "3)" in Table 1 included an eight-millimeter buffer tube containing 48 optical fibers, four water-swellable yarns, and a water-swellable tape having a width of 26 millimeters. This fiber optic cable failed the seawater test as the seawater flowed more than three meters during the two hours of the test.

The fiber optic cable denoted "4)" in Table 1 included an eight-millimeter buffer tube containing 48 optical fibers, four water-swellable yarns, and a water-swellable tape having a width of 30 millimeters. The water-swellable tape was wrapped lengthwise over the optical fibers and two of the four water-swellable yarns. The other two water-swellable yarns were located between the water-swellable tape and the inner surface of the buffer tube. This fiber optic cable failed the seawater test as the seawater flowed more than three meters during the twenty-four-hour test period.

The fiber optic cable denoted "5)" in Table 1 included an eight-millimeter buffer tube containing 48 optical fibers, four water-swellable yarns, and a water-swellable tape having a width of 30 millimeters wrapped over the optical fibers and the water-swellable yarns. In other words, this fiber optic cable featured a buffer-tube architecture consistent with the exemplary embodiment 100 illustrated in FIG. 1 and discussed above. This test cable passed the seawater test as the seawater flowed less than three meters over the full twenty-four-hour test period.

Based on these test results, it is believed that adding additional water-swellable yarns to the fiber optic cable denoted "5)" (adjacent the four water-swellable yarns present), would further limit the flow distance. For example, via adding one, two, three, or four additional water-swellable yarns, water flow could be limited to one meter or substantially less over the twenty-four hour test period. However, in many applications, the indicated performance would be acceptable.

TABLE 1

Results of Seawater Penetration Tests

| | Cable Description | Flow Distance (330) at Indicated Time After Wetting | | | | Result |
| --- | --- | --- | --- | --- | --- | --- |
| | | 2 min | 1 hr | 2 hrs | 24 hrs | |
| 1) | 8 mm Buffer Tube w/48 optical fibers. 26 mm wide water-swellable tape. | >3 m | n/a | n/a | n/a | fail |
| 2) | 8 mm Buffer Tube w/48 optical fibers. 26 mm wide water-swellable tape, plus 2 water-swellable yarns. | 2.11 m | >3 m | n/a | n/a | fail |
| 3) | 8 mm Buffer Tube w/48 optical fibers. 26 mm wide water-swellable tape, plus 4 water-swellable yarns. | 1.37 m | 2.33 m | >3 m | n/a | fail |
| 4) | 8 mm Buffer Tube w/48 optical fibers. 30 mm wide water-swellable tape, plus 4 water-swellable yarns. (2 yarns under tape, 2 yarns over tape) | 1.00 m | 1.26 m | 1.44 m | >3 m | fail |
| 5) | 8 mm Buffer Tube w/48 optical fibers. 30 mm wide water-swellable tape, plus 4 water-swellable yarns. (all 4 yarns under tape) | 1.18 m | 1.30 m | 1.36 m | 2.65 m | pass |

Table 2 shows the results of subjecting three commercial cable products to the seawater testing method of the process 400, as described above with reference to FIGS. 3 and 4. Accordingly, the samples of Table 1 and Table 2 all underwent a common testing procedure.

Although each of the commercial cable products described in Table 2 are marketed as providing seawater resistance, all failed the seawater testing of the process 400 that is described above with reference to FIGS. 3 and 4.

Commercial Product 1 was a fiber optic cable that included a dry buffer tube containing 48 optical fibers and water-swellable yarns. A three-meter sample of this product failed the seawater test as seawater flowed at least three meters in approximately three hours.

Commercial Product 2 was a fiber optic cable that included a dry buffer tube containing 144 optical fibers and water-swellable yarns. A three-meter sample of this product failed the seawater test as seawater flowed at least three meters in approximately two hours.

Commercial Product 3 was a fiber optic cable that included a dry buffer tube containing 144 optical fibers and a water-swellable tape comprising foamed polymer material. A three-meter sample of this product failed the seawater test as seawater flowed at least three meters in approximately five minutes.

TABLE 2

Results of Seawater Penetration Tests on Commercial Products

| | Cable Description | Result | Time to Failure |
|---|---|---|---|
| Commercial Product 1 | Dry buffer tube w/48 optical fibers. Water-swellable yarns only. | Failed | ~3 hours |
| Commercial Product 2 | Dry buffer tube w/144 optical fibers. Water-swellable yarns only. | Failed | ~2 hours |
| Commercial Product 3 | Dry buffer tube w/144 optical fibers. Water-swellable foamed tape only. | Failed | ~5 minutes |

Tables 1 and 2 show that seawater resistance for dry fiber optic cables depends significantly upon configuration of water-swellable materials. The unexpected results presented in Tables 1 and 2 confirm that exemplary embodiments of the present invention can provide a marked improvement over conventional approaches.

Technology for protecting a cabled optical fiber from water has been described. From the description, it will be appreciated that an embodiment of the present invention overcomes the limitations of the prior art. Those skilled in the art will appreciate that the present invention is not limited to any specifically discussed application or implementation and that the embodiments described herein are illustrative and not restrictive. From the description of the exemplary embodiments, equivalents of the elements shown therein will suggest themselves to those skilled in the art, and ways of constructing other embodiments of the present invention will appear to practitioners of the art. Therefore, the scope of the present invention is to be limited only by the claims that follow.

What is claimed is:

1. A fiber optic cable comprising:
   a buffer tube;
   a jacket circumferentially covering the buffer tube;
   a water-swellable tape, a water-swellable yarn, and a plurality of optical fibers disposed in the buffer tube; and
   a dry space within the buffer tube that extends along the buffer tube,
   wherein the fiber optic cable is operable to limit advance of seawater, under a head pressure of approximately one meter, through the dry space to less than approximately three meters in twenty four hours, and wherein the water-swellable tape, the water-swellable yarn, and the plurality of optical fibers substantially contact one another.

2. The fiber optic cable of claim 1, wherein limiting advance of seawater to less than approximately three meters in twenty four hours comprises limiting advance of seawater to a range between approximately 2.65 meters and approximately three meters.

3. The fiber optic of claim 1, wherein the fiber optic cable is operable to limit advance of the seawater to between approximately two-and-one-half meters and approximately three meters during a twenty-four hour period of time that follows the buffer tube contacting the seawater.

4. The fiber optic cable of claim 1, wherein the fiber optic cable is further operable to limit advance of seawater, having a head pressure of at least one meter, through the dry space to less than approximately three meters during a twenty-four hour period following subjecting the fiber optic cable to the seawater.

5. The fiber optic cable of claim 1, wherein the seawater comprises approximately three percent salt by weight.

6. The fiber optic cable of claim 1, wherein the seawater has a specific gravity of approximately 1.019.

7. The fiber optic cable of claim 1, wherein the water-swellable tape and the water-swellable yarn each comprises sodium polyacrylate.

8. The fiber optic cable of claim 1, wherein the fiber optic cable comprises sodium polyacrylate for limiting advance of the seawater.

9. The fiber optic cable of claim 1, wherein the water-swellable tape is curled around the water-swellable yarn and the plurality of optical fibers.

10. The fiber optic cable of claim 1, wherein each of the fiber optic cable, the buffer tube, and the jacket is substantially centered about a common axis, and wherein the buffer tube comprises plastic material.

* * * * *